(12) United States Patent
Jung et al.

(10) Patent No.: US 12,530,291 B2
(45) Date of Patent: Jan. 20, 2026

(54) MEMORY DEVICE SUPPORTING VEHICLE STATUS MODE, OPERATING METHOD OF MEMORY DEVICE, AND MEMORY SYSTEM

(71) Applicant: Samsung Electronics Co., Ltd., Suwon-si (KR)

(72) Inventors: Byungsue Jung, Suwon-si (KR); Kyungduk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/794,304

(22) Filed: Aug. 5, 2024

(65) Prior Publication Data
US 2025/0086106 A1    Mar. 13, 2025

(30) Foreign Application Priority Data

Sep. 13, 2023   (KR) ................. 10-2023-0122074

(51) Int. Cl.
| | |
|---|---|
| *G06F 12/02* | (2006.01) |
| *H01L 23/00* | (2006.01) |
| *H01L 25/065* | (2023.01) |
| *H01L 25/18* | (2023.01) |
| *H10B 41/27* | (2023.01) |
| *H10B 43/27* | (2023.01) |
| *H10B 80/00* | (2023.01) |

(52) U.S. Cl.
CPC .......... *G06F 12/0246* (2013.01); *H01L 24/08* (2013.01); *H01L 25/0657* (2013.01); *H01L 25/18* (2013.01); *H10B 41/27* (2023.02); *H10B 43/27* (2023.02); *H10B 80/00* (2023.02); *G06F 2212/7205* (2013.01); *H01L 2224/08145* (2013.01); *H01L 2924/1431* (2013.01); *H01L 2924/14511* (2013.01)

(58) Field of Classification Search
None
See application file for complete search history.

(56) References Cited

U.S. PATENT DOCUMENTS

| | | |
|---|---|---|
| 9,058,208 B2 | 6/2015 | Chang et al. |
| 9,910,622 B2 | 3/2018 | Law |
| 10,055,131 B2 | 8/2018 | Shin |
| 10,229,049 B2 | 3/2019 | Hashimoto |

(Continued)

FOREIGN PATENT DOCUMENTS

CN    113377278 A    9/2021

OTHER PUBLICATIONS

Extended Search Report issued Feb. 18, 2025 in European Application No. 24199688.3.

*Primary Examiner* — Kevin Verbrugge
(74) *Attorney, Agent, or Firm* — Fish & Richardson P.C.

(57) ABSTRACT

A memory device, which receives a vehicle status mode command from a host and executes background jobs based on the received vehicle status mode command, includes a command executor configured to generate a command on the background jobs based on the received vehicle status mode command, a scheduler configured to receive the command on the background jobs, determine whether a vehicle status is a status in which the background jobs are able to be executed, and generate the background jobs based on a determination result, and a background job executor configured to execute the background jobs generated by the scheduler.

20 Claims, 15 Drawing Sheets

(56) References Cited

U.S. PATENT DOCUMENTS

| | | |
|---|---|---|
| 10,282,102 B2 | 5/2019 | Falanga et al. |
| 10,877,882 B1 | 12/2020 | Liang et al. |
| 11,074,177 B2 | 7/2021 | He et al. |
| 2014/0137128 A1 | 5/2014 | Chang et al. |
| 2021/0255799 A1* | 8/2021 | Kale ................. G06N 3/049 |
| 2021/0256349 A1* | 8/2021 | Bielby ............... G06N 3/049 |
| 2022/0179585 A1 | 6/2022 | Muthiah |
| 2023/0195362 A1 | 6/2023 | Bi |

* cited by examiner

FIG. 4

| Bytes | Description |
|---|---|
| 03:00 | Command Dword 0 (CDW0) |
| 07:04 | Namespace Identifier(NSID) |
| 15:08 | Reserved |
| 39:16 | Definition |
| 43:40 | NDT(Numder of Dwords in Data Transfer) |
| 47:44 | NDM(Numder of Dwords in Metadata Transfer) |
| 51:48 | CDW12(Command Dword 12) |
| 55:52 | CDW13(Command Dword 13) |
| 59:56 | CDW14(Command Dword 14) |
| 63:60 | CDW15(Command Dword 15) |

MEMORY DEVICE SUPPORTING VEHICLE STATUS MODE, OPERATING METHOD OF MEMORY DEVICE, AND MEMORY SYSTEM

CROSS-REFERENCE TO RELATED APPLICATION

This application is based on and claims priority under 35 U.S.C. § 119 to Korean Patent Application No. 10-2023-0122074, filed on Sep. 13, 2023, in the Korean Intellectual Property Office, the disclosure of which is incorporated by reference herein in its entirety.

BACKGROUND

Various example embodiments relate to a memory device that supports a vehicle status mode, an operating method of the memory device, and a memory system, and particularly, to a memory device that executes a background job for a memory device in a vehicle status mode, an operating method of the memory device, and a memory system.

Recently-developed vehicles have basic functions, which require (or alternatively, include) memory devices, such as autonomous drive functions or vehicle status memory functions. Accordingly, a memory device installed in a vehicle has to execute a background job, such as a garbage collection operation, but the memory device installed in the vehicle may not execute the background job depending on vehicle statuses.

Accordingly, the background jobs are not performed by the memory devices at an appropriate time, and the performance of the memory devices installed in the vehicles degrades due to degradation of memory cells.

SUMMARY

Inventive concepts provide a memory device that executes a background job according to a vehicle status.

Also, inventive concepts provide a memory system that determines the sequence of background jobs according to a vehicle status and executes the background jobs for a memory device in the determined sequence.

Some example embodiments of inventive concepts provide a memory device including a command executor configured to generate a command on background jobs based on a received vehicle status mode command, a scheduler configured to receive the command on the background jobs, determine whether a vehicle status is a status in which the background jobs are able to be executed, and generate the background jobs based on a determination result, and a background job executor configured to execute the background jobs generated by the scheduler. The scheduler is configured to set the vehicle status as at least one of a start status, a drive status, a stop status, a charging status, and a drive-stop status when the vehicle status is determined to be a status in which the background jobs are able to be executed, and the scheduler is further configured to determine a sequence of the background jobs based on the set vehicle status, and the memory device is configured to receive the vehicle status mode command from a host and the memory device is further configured to execute the background jobs based on the received vehicle status mode command.

Some example embodiments of inventive concepts provide an operating method of a memory device including receiving a vehicle status mode command from a host, and executing background jobs based on the received vehicle status mode command. The executing of the background jobs includes generating a command on the background jobs based on the received vehicle status mode command, receiving the command on the background jobs, determining whether a vehicle status is a status in which the background jobs are able to be executed, and generating the background jobs based on a determination result, and executing the generated background jobs. In the generating of the background jobs, the vehicle status is set as at least one of a start status, a drive status, a stop status, a charging status, and a drive-stop status when the vehicle status is determined to be a status in which the background jobs are able to be executed, and a sequence of the background jobs is determined based on the set vehicle status.

Some example embodiments of inventive concepts provide a memory system including a host configured to generate a vehicle status mode command, and a memory device configured to receive the vehicle status mode command from the host and execute background jobs based on the received vehicle status mode command. The memory device includes a command executor configured to receive the vehicle status mode command and generate a command on the background jobs based on the received vehicle status mode command, a scheduler configured to receive the command on the background jobs, determine whether a vehicle status is a status in which the background jobs are able to be executed, and generate the background jobs based on a determination result, and a background job executor configured to execute the background jobs generated by the scheduler. The scheduler is configured to set the vehicle status as at least one of a start status, a drive status, a stop status, a charging status, and a drive-stop status when the vehicle status is determined to be a status in which the background jobs are able to be executed, and the scheduler is further configured to determine a sequence of the background jobs based on the set vehicle status.

BRIEF DESCRIPTION OF THE DRAWINGS

Some example embodiments of inventive concepts will be more clearly understood from the following detailed description taken in conjunction with the accompanying drawings in which:

FIG. 4 illustrates vehicle status mode commands according to an example embodiment;

DETAILED DESCRIPTION

Hereinafter, various example embodiments of inventive concepts are described with reference to the attached drawings. Hereinafter, details, such as a configuration and a structure, are provided to help readers understand various example embodiments of inventive concepts. Therefore, various example embodiments described herein may be changed or modified in various ways without departing from the present inventive concepts.

As described herein, an element that is "on" another element may be above or beneath or adjacent (e.g., horizontally adjacent) to the other element. An element that is on another element may be directly on the other element, such that the element is in direct contact with the other element. An element that is on another element may be indirectly on the other element, such that the element is isolated from direct contact with the other element by one or more interposing spaces and/or structures.

It will be understood that elements and/or properties thereof (e.g., structures, surfaces, directions, or the like), which may be referred to as being "perpendicular," "parallel," or the like with regard to other elements and/or properties thereof (e.g., structures, surfaces, directions, or the like) may be "perpendicular," "parallel," or the like or may be "substantially perpendicular," "substantially parallel," respectively, with regard to the other elements and/or properties thereof.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

Figure 1:
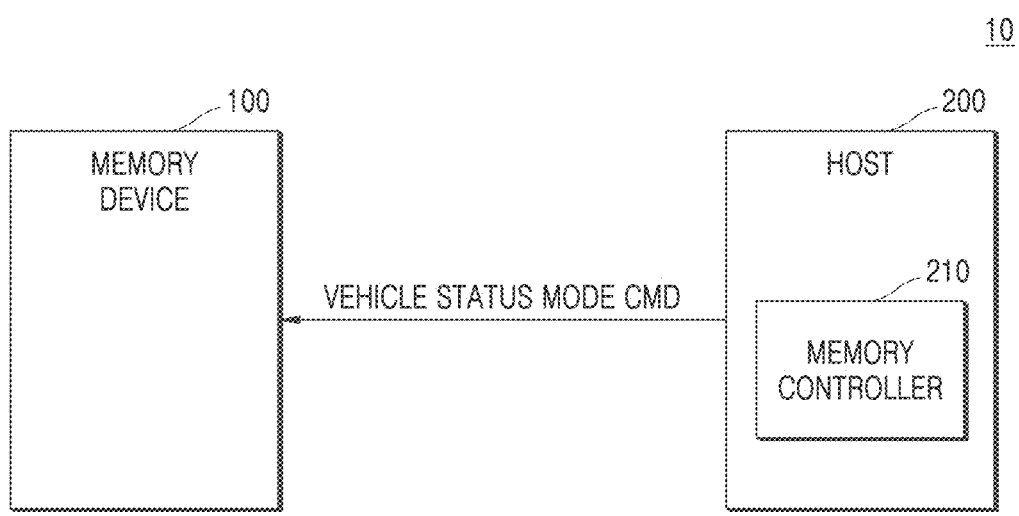
FIG. 1 is a block diagram of a memory system according to an example embodiment.

FIG. 1 is a block diagram illustrating a memory system 10 according to an example embodiment.

Referring to FIG. 1, the memory system 10 according to some example embodiments may include a memory device 100 and a host 200.

The memory device 100 according to an example embodiment may receive a vehicle status mode command Vehicle Status Mode CMD from the host 200 and execute a background job based on the received vehicle status mode command Vehicle Status Mode CMD. A vehicle status mode according to an example embodiment refers to a status in which the host 200 may determine a vehicle status and determine whether to execute a background job. A background job according to an example embodiment may be a job executed by the memory device 100 without a separate individual command from the host 200. For example, the background job may include at least one of a garbage collection operation, a patrol read operation, a flush operation, a data retention check operation, and a reclaim operation for the memory device 100, but is not limited thereto this and may further include jobs that the memory device 100 may execute without using a separate command.

The memory device 100 according to an example embodiment may generate a command on a background job based on a vehicle status mode command Vehicle Status Mode CMD received from the host 200 and determine whether a vehicle status is status in which the background job may be executed. The memory device 100 according to an example embodiment may generate classified background jobs based on the determination result. Also, when it is determined that a vehicle status is a status in which a background job may be executed, the memory device 100 according to an example embodiment may classify vehicle statuses into a start status, a drive status, a stop status, a charging status, and a drive-stop status, and determine a sequence of the background jobs based on the classified vehicle statuses. The memory device 100 according to an example embodiment may generate background jobs based on the determination result, determine a sequence of the generated background jobs, and execute the background jobs in the determined sequence. For example, when it is determined that the vehicle status is a status in which the background jobs may be executed, the memory device 100 may determine the sequence of the background jobs based on a vehicle status and perform at least one of a garbage collection operation, a patrol read operation, a flush operation, a data retention check operation, and a reclaim operation in the determined sequence.

The memory device 100 according to an example embodiment may include at least one of a volatile memory device and a non-volatile memory device. For example, volatile memory devices include static random access memory (RAM) (SRAM), dynamic RAM (DRAM), and synchronous DRAM (SDRAM). Non-volatile memory devices retain stored data even when power is disconnected. For example, the non-volatile memory devices include read-only memory (ROM), programmable ROM (PROM), electrically programmable ROM (EPROM), and electrically erasable and programmable ROM (EEPROM), flash memory, phase change RAM (PRAM), magnetic RAM (MRAM), resistive RAM (RRAM), ferroelectric RAM (FRAM), and so on. The flash memory may be classified into NOR-type flash memory and NAND-type flash memory. A configuration of the memory device 100 is described in detail with reference to FIG. 2.

The host 200 according to an example embodiment may generate the vehicle status mode command Vehicle Status Mode CMD and transmit the generated vehicle status mode command Vehicle Status Mode CMD to the memory device 100. For example, the host 200 may include a memory controller 210, and the memory controller 210 may generate the vehicle status mode command Vehicle Status Mode CMD and transmit the generated vehicle status mode command Vehicle Status Mode CMD to the memory device 100. The host 200 according to an example embodiment may be included in a vehicle to generate a plurality of commands and transmit the plurality of commands to the memory device 100. For example, vehicles refer to various apparatuses that move transportation targets, such as humans, objects, or animals, from a start point to a destination. The vehicles may include a vehicle traveling on a road or track, a ship moving on the sea or river, and an airplane flying in the sky through the air, but example embodiments are not limited thereto.

Figure 2:
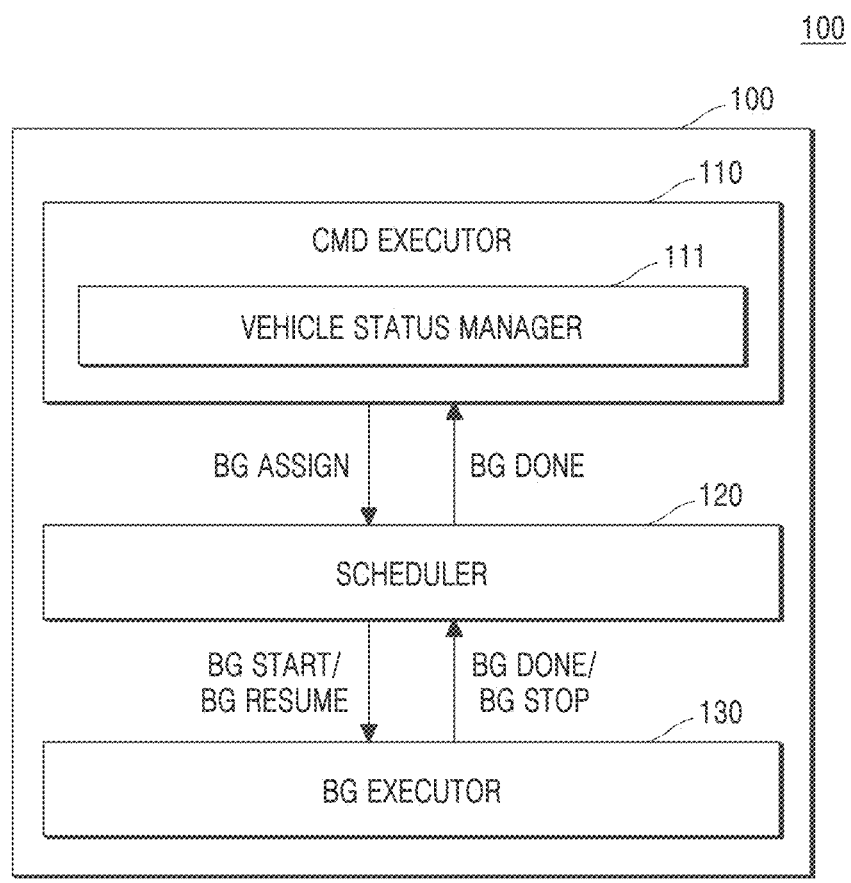
FIG. 2 is a block diagram of a memory device according to an example embodiment.

FIG. 2 is a block diagram illustrating the memory device 100 according to an example embodiment.

Referring to FIGS. 1 and 2, the memory device 100 according to an example embodiment may include a command executor 110, a scheduler 120, and a background job executor 130. The command executor 110, the scheduler 120, and the background job executor 130 may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The command executor 110 according to an example embodiment may receive the vehicle status mode command Vehicle Status Mode CMD from the host 200 and generate a command BG Assign for a background job based on the received vehicle status mode command Vehicle Status Mode CMD. For example, the command executor 110 may include a vehicle status manager 111, and the vehicle status manager 111 may generate the command BG Assign for a background job based on the vehicle status mode command Vehicle Status Mode CMD. The command executor 110 according to an example embodiment may transmit the generated command BG Assign for a background job to the scheduler 120. For example, the command executor 110 may receive the vehicle status mode command Vehicle Status Mode CMD from the host 200, determine a background job according to a vehicle status, and generate the command BG Assign for a background job required (or alternatively, used) for a vehicle.

The scheduler 120 according to an example embodiment may receive the command BG Assign for a background job, determine whether a vehicle may execute a background job, and generate the classified background jobs based on the determination result. Also, when it is determined that a vehicle status is a status in which a background job may be executed, the scheduler 120 according to an example embodiment may classify vehicle statuses into a start status, a drive status, a stop status, a charging status, and a drive-stop status and determine the sequence of background jobs based on the classified vehicle statuses. For example, when it is determined that a vehicle status is a status in which a background job may be executed, the memory device 100 may determine the sequence of background jobs based on a vehicle status and perform at least one of a garbage collection operation, a patrol read operation, a flush operation, a data retention check operation, and a reclaim operation in the determined sequence.

The scheduler 120 according to an example embodiment may generate a necessary (or alternatively, an advantageous) background job according to the vehicle status. For example, the command executor 110 may transmit the command BG Assign for a background job required (or alternatively, used) for a vehicle to the scheduler 120 according to a vehicle status, and the scheduler 120 may generate a background job according to a vehicle status based on the received command BG Assign for a background job. Also, when the background job is terminated, the scheduler 120 according to an example embodiment may transmit a background job success signal BG Done to the command executor 110. Generation of a background job according to an example embodiment may indicate generation of input data for executing the background job by the scheduler 120. Descriptions of generation of the background job by the scheduler 120 are described in detail with reference to FIG. 3.

For example, when a vehicle status is a start status, the scheduler 120 may generate a background job for performing a data retention check operation for the memory device 100 and perform the data retention check operation. The start status according to an example embodiment may be a status in which power starts to be supplied to a vehicle. For example, when power starts to be supplied to a vehicle, the scheduler 120 may perform a data retention check operation for the memory device 100. The data retention check operation according to an example embodiment may include an operation of determining whether data stored therein has to be retained because at least one of memory cells included in the memory device 100 degrades. When there is a memory block of a retention target, the scheduler 120 according to an example embodiment may set the data retention operation for the memory device 100 as an emergency background job. The emergency background job according to an example embodiment may be a job that has to be executed with the highest priority (or alternatively, with priority) among background jobs determined by the scheduler 120.

In another example, when a vehicle status is a start status, the scheduler 120 may generate a background job for performing a garbage collection operation for the memory device 100 and cause the garbage collection operation to be performed. When it is determined that a vehicle status is a start status, the scheduler 120 according to an example embodiment may determine whether there is invalid data in a memory block of the memory device 100, move valid data in the memory block, and obtain a free block by erasing the memory block.

In another example, when a vehicle status is a drive status, the scheduler 120 may stop the background job. The drive status according to an example embodiment may be a status in which a vehicle moves without stopping while power is supplied to the vehicle. In some example embodiments, when it is determined that the vehicle status is the drive status, the scheduler 120 may stop the background job executed by the vehicle and cause the job executed by a certain command to be executed.

In another example, when the vehicle status is a stop status, the scheduler 120 may determine whether the vehicle status is a normal stop status or a signal waiting status. The stop status according to an example embodiment may be a status in which power is supplied to a vehicle and the vehicle does not move. The normal stop status according to an example embodiment may be a status in which a vehicle stops in drive while power is being supplied to the vehicle and is not in a signal waiting status. The signal waiting status according to an example embodiment may be a status in which a vehicle stops in drive and stops to wait for a signal, based on a detection result of a sensor installed in a vehicle. For example, the scheduler 120 may determine whether the vehicle status is a normal stop status or a signal waiting status by a sensor installed in the vehicle. When it is determined that the vehicle status is the signal waiting status, the scheduler 120 according to an example embodiment may determine that a background job may be executed during a signal waiting time and generate background jobs to be executed. For example, when it is determined that the signal waiting time is 3 minutes as a result of a sensor's detection, the scheduler 120 may generate a background job to be executed for 3 minutes. However, the signal waiting time is not limited thereto.

When the vehicle status is the normal stop status, the scheduler 120 according to an example embodiment may execute only an emergency background job (or alternatively, the scheduler 120 may execute an emergency background job). The emergency background job according to an example embodiment may be a background job with the highest priority (or alternatively, with priority) among the background jobs generated by the scheduler 120. For example, when the vehicle status is the normal stop status, the scheduler 120 may generate only the emergency background job (or alternatively, the scheduler 120 may generate the emergency background job). When the generated emergency background job is a data retention operation, the scheduler 120 according to an example embodiment may perform only the data retention operation when a vehicle status is the normal stop status (or alternatively, the scheduler 120 may perform the data retention operation when the vehicle status is the normal stop status).

When the vehicle status is the signal waiting status, the scheduler 120 according to an example embodiment may execute the generated background jobs. For example, when the vehicle status is the signal waiting status, the scheduler 120 may generate background jobs based on the received vehicle status mode command Vehicle Status Mode CMD and determine the sequence of the generated background jobs. When the vehicle status is the signal waiting status, the scheduler 120 according to an example embodiment may generate background jobs such that the generated background jobs are executed sequentially.

When the vehicle status is a charging status, the scheduler 120 according to an example embodiment may execute the generated background jobs. The charging status according to an example embodiment may be a status in which a vehicle stops and receives power from an external power supply to charge a battery in the vehicle. For example, when the vehicle status is the charging status, the scheduler 120 may generate background jobs based on the received vehicle status mode command Vehicle Status Mode CMD and determine the sequence of the generated background jobs. When the vehicle status is the charging status, the scheduler 120 according to an example embodiment may generate background jobs such that the generated background jobs are executed sequentially.

When the vehicle status is a drive-stop status, the scheduler 120 according to an example embodiment may receive power-off time information on the memory device 100, determine the sequence of the generated background jobs, and execute the background jobs in order of priority based on the power-off time information. The drive-stop status according to an example embodiment may be a status in which a vehicle stops and power supplied to the vehicle is disconnected. When the vehicle status is the drive-stop status, the power supplied to the memory device 100 according to an example embodiment may also be disconnected. When the vehicle status is the drive-stop status, the scheduler 120 may receive information on the time until the power supplied to the memory device 100 is completely disconnected (or alternatively, is disconnected) and execute the generated background jobs in order of priority.

The background job executor 130 according to an example embodiment may execute the background jobs generated by the scheduler 120. For example, the background job executor 130 may receive a background job start command BG Start or a background job resume command BG Resume generated by the scheduler 120 and execute the background jobs generated by the scheduler 120 in the determined sequence. When the background jobs are completed, the background job executor 130 according to an example embodiment may transmit a background job success signal BG Done or a background job stop signal BG Stop to the scheduler 120.

Figure 3:
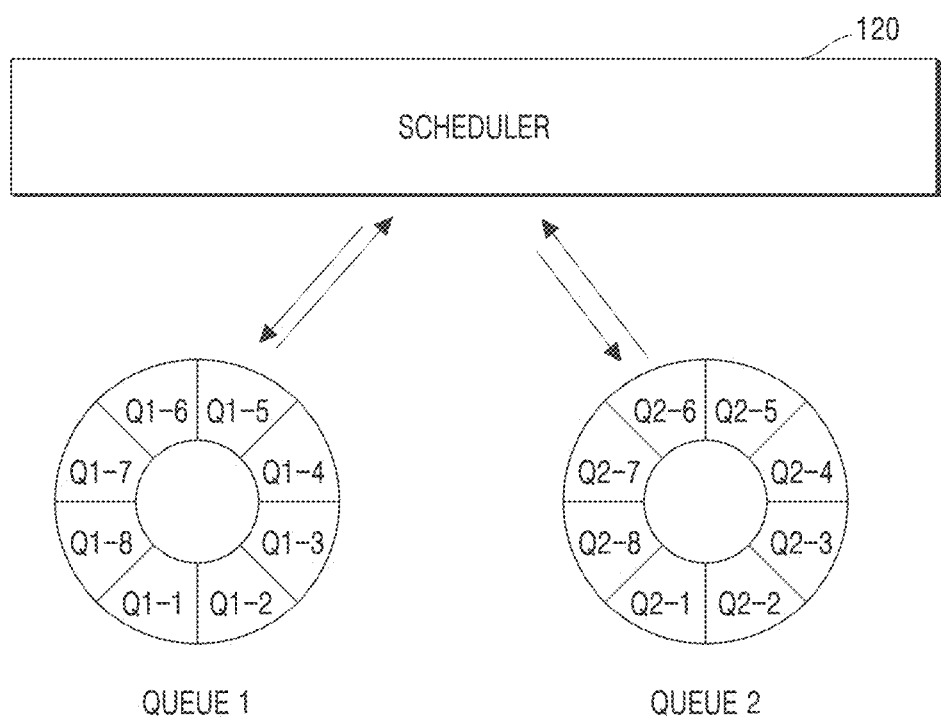
FIG. 3 is a block diagram illustrating a scheduler according to an example embodiment.

FIG. 3 is a block diagram illustrating the scheduler 120 according to an example embodiment.

Referring to FIG. 3, the scheduler 120 according to an example embodiment may generate background jobs by generating a data queue. For example, the scheduler 120 may generate information on a background job to be executed as the data queue based on a command on the background job. For example, the scheduler 120 may determine the sequence of background jobs by generating a first data queue Queue1 or a second data queue Queue2. According to an example embodiment, the first data queue Queue1 may include information on an emergency background job, and the second data queue Queue2 may include information on a normal background job. When information on the emergency background job is stored in the first data queue Queue1, the scheduler 120 according to an example embodiment may execute the background job based on the information on the first data queue Queue1 with priority over the background job based on the information on the second data queue Queue2.

The first data queue Queue1 according to an example embodiment may include a plurality of pieces of data Q1-1, Q1-2, Q1-3, Q1-4, Q1-5, Q1-6, Q1-7, and Q1-8. Although FIG. 3 illustrates that the first data queue Queue1 includes eight pieces of data, the number of pieces of data included in the first data queue Queue1 is not limited thereto and a plurality of pieces of data may be further included in the first data queue Queue1. The second data queue Queue2 according to an example embodiment may also include a plurality of pieces of data Q2-1, Q2-2, Q2-3, Q2-4, Q2-5, Q2-6, Q2-7, and Q2-8. Although FIG. 3 illustrates that the second data queue Queue2 includes eight pieces of data, the number of pieces of data included in the second data queue Queue2 is not limited thereto and a plurality of pieces of data may be further included in the second data queue Queue2.

FIG. 4 illustrates vehicle status mode commands according to an example embodiment.

Referring to FIGS. 1 and 4, the memory device 100 according to an example embodiment may include a non-volatile memory, and the host 200 may generate the vehicle status mode command Vehicle Status Mode CMD by using a non-volatile memory express (NVMe) standard. The NVMe standard according to an example embodiment defines a register-level interface for host software to communicate with a non-volatile memory subsystem (for example, a solid state drive (SSD)) through a peripheral component interconnect express (PCIe) bus.

In the example embodiment of FIG. 4, the vehicle status mode command CMD may include data having a plurality of bytes as a unit. For example, the vehicle status mode command Vehicle Status Mode CMD may include command start data CDW0 at a position of 03:00 and a command identifier (e.g., namespace identifier) NSID at a position of 08:04. Also, the vehicle status mode command Vehicle Status Mode CMD may include a preliminary data string Reserved at a position of 15:08 and command definition data Definition at a position of 39:16. Also, the vehicle status mode command Vehicle Status Mode CMD may include data piece information (e.g., number of dwords in data transfer) NDT transferred at a position of 43:40 and metadata piece information (e.g., number of dwords in metadata transfer) NDM transferred at a position of 47:44.

The vehicle status mode command Vehicle Status Mode CMD according to an example embodiment may include first command information (e.g., command dword 12) CDW12 at a position of 51:48, second command information (e.g., command dword 13) CDW13 at a position of 55:52, third command information (e.g., command dword 14) CDW14 at a position of 59:56, and fourth command information (e.g., command dword 15) CDW15 at a position of 63:60. The host 200 according to an example embodiment may generate the vehicle status mode command Vehicle Status Mode CMD by using the NVMe standard and change data of the first command information CDW12, the second command information CDW13, the third command information CDW14, or the fourth command information CDW15 to determine the background jobs to be executed. For example, the host 200 may determine data on background information to be performed for the data of the first command information CDW12, the second command information CDW13, the third command information CDW14, or the fourth command information CDW15, and cause background jobs to be executed in a vehicle status mode of the memory device 100. However, the memory system 10 according to an example embodiment utilizing the NVMe standard is only an example for generating the vehicle status mode command Vehicle Status Mode CMD and may generate the vehicle status mode command Vehicle Status Mode CMD by using various methods.

Figure 5:
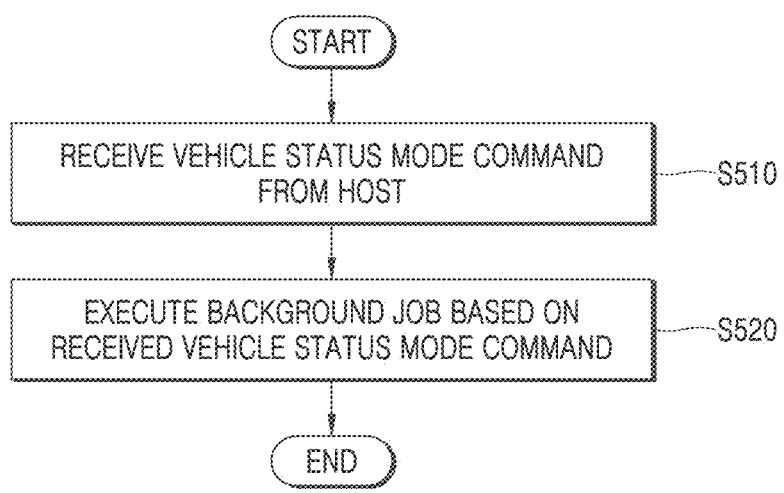
FIG. 5 is a flowchart illustrating an operating method of a memory device, according to an example embodiment.

FIG. 5 is a flowchart illustrating an operating method of a memory device, according to an example embodiment.

Referring to FIGS. 1 and 5, the memory device 100 according to an example embodiment may receive the vehicle status mode command Vehicle Status Mode CMD from the host 200 (S510).

The host 200 according to an example embodiment may generate the vehicle status mode command Vehicle Status Mode CMD and transmit the generated vehicle status mode command Vehicle Status Mode CMD to the memory device 100. The host 200 according to an example embodiment may be included in a vehicle to generate and transmit a plurality of commands to the memory device 100.

When receiving the vehicle status mode command Vehicle Status Mode CMD, the memory device 100 according to an example embodiment may execute a background job based on the received vehicle status mode command Vehicle Status Mode CMD (S520).

The background job according to an example embodiment may be a job executed by the memory device 100 without a separate individual command from the host 200. For example, the background job may include at least one of a garbage collection operation, a patrol read operation, a flush operation, a data retention check operation, and a reclaim operation for the memory device 100 but is not limited thereto and may further include jobs that the memory device 100 may execute without using a separate command.

The memory device 100 according to an example embodiment may generate a command on a background job based on the vehicle status mode command Vehicle Status Mode CMD received from the host 200 and determine whether a vehicle status is a status in which a background job may be executed. The memory device 100 according to an example embodiment may generate classified background jobs based on the determination result. Also, when it is determined that a vehicle status is a status in which a background job may be executed, the memory device 100 according to an example embodiment may classify the vehicle status into at least one of a start status, a drive status, a stop status, a charging status, and a drive-stop status and determine a sequence of background jobs based on the classified vehicle status. The memory device 100 according to an example embodiment may generate the classified background jobs based on the determination result, determine the sequence of the generated background jobs, and execute the background jobs in the determined sequence. For example, when it is determined that a vehicle status is a status in which a background job may be executed, the memory device 100 may determine the sequence of background jobs based on the vehicle status and perform at least one of a garbage collection operation, a patrol read operation, a flush operation, a data retention check operation, and a reclaim operation in the determined sequence.

Figure 6:
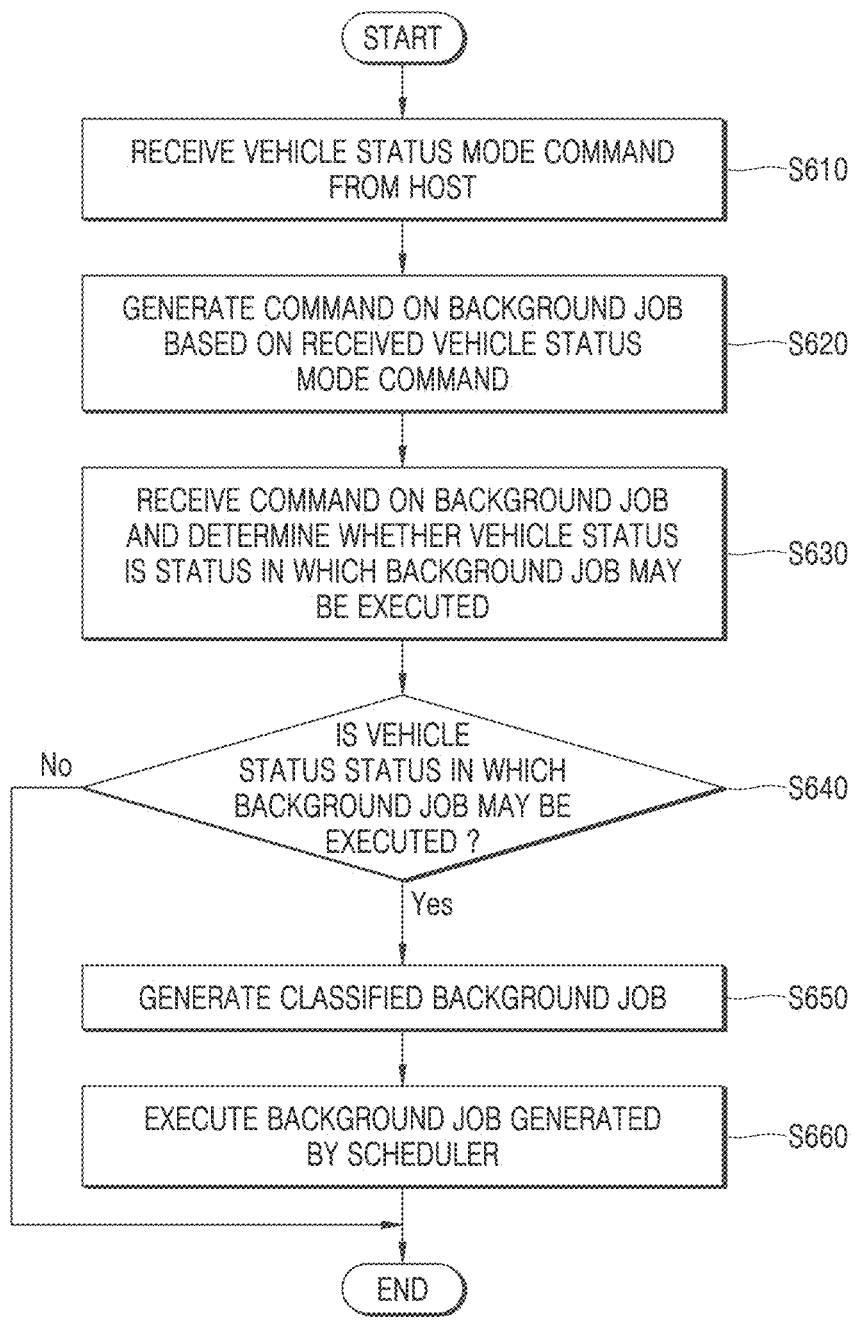
FIG. 6 is a flowchart illustrating a process of executing a background job in an operating method of a memory device according to an example embodiment.

FIG. 6 is a flowchart illustrating a process of executing a background job in an operating method of a memory device, according to an example embodiment.

Referring to FIGS. 1 and 6, the memory device 100 according to an example embodiment may receive the vehicle status mode command Vehicle Status Mode CMD from the host 200 (S610). A vehicle status mode according to an example embodiment refers to a status in which the host 200 may determine a vehicle status and determine whether to execute a background job. The memory device 100 according to an example embodiment may receive the vehicle status mode command Vehicle Status Mode CMD from the host 200 and execute a background job based on the received vehicle status mode command Vehicle Status Mode CMD.

When receiving the vehicle status mode command Vehicle Status Mode CMD, the memory device 100 according to an example embodiment may generate a command on a background job based on the received vehicle status mode command Vehicle Status Mode CMD (S620).

The memory device 100 according to an example embodiment may receive the vehicle status mode command Vehicle Status Mode CMD from the host 200 and execute the background job based on the received vehicle status mode command Vehicle Status Mode CMD. For example, the memory device 100 may receive the vehicle status mode command Vehicle Status Mode CMD from the host 200, determine a background job according to a vehicle status, and generate a command BG Assign for the background job required (or alternatively, used) for a vehicle.

The memory device 100 according to an example embodiment may receive the command on the background job and determine whether a vehicle status is a status in which the background job may be executed (S630). The memory device 100 according to an example embodiment may receive the command BG Assign for a background job, determine whether a vehicle status is a status in which the background job may be executed, and generate the classified background jobs based on the determination result.

When it is determined that the vehicle status is the status in which the background job may be executed, the memory device 100 according to an example embodiment may generate the classified background jobs (S640 and S650).

The memory device 100 according to an example embodiment may generate necessary (or alternatively, advantageous) background jobs according to the vehicle status. For example, the memory device 100 may generate the command BG Assign for a background job required (or alternatively, used) for a vehicle according to the vehicle status and generate a background job according to the vehicle status based on the command BG Assign for a background job. Generation of a background job according to an example embodiment may indicate generation of input data for executing the background job by the memory device 100.

However, when it is determined that the vehicle status is a status in which a background job may not be executed, the memory device 100 according to an example embodiment may terminate a background job without executing the background job.

When it is determined that the vehicle status is a status in which a background job may be executed and the classified background jobs are generated, the memory device 100 according to an example embodiment may execute the background jobs generated by the scheduler 120 (S660).

When it is determined that the vehicle status is a status in which a background job may be executed, the memory device 100 according to an example embodiment may classify the vehicle status into at least one of a start status, a drive status, a stop status, a charging status, and a drive-stop status and determine the sequence of background jobs based on the classified vehicle status. For example, when it is determined that the vehicle status is the status in which the background job may be executed, the memory device 100 may determine the sequence of the background jobs based on the vehicle status and perform at least one of a garbage collection operation, a patrol read operation, a flush operation, a data retention check operation, and a reclaim operation in the determined sequence.

Figure 7:
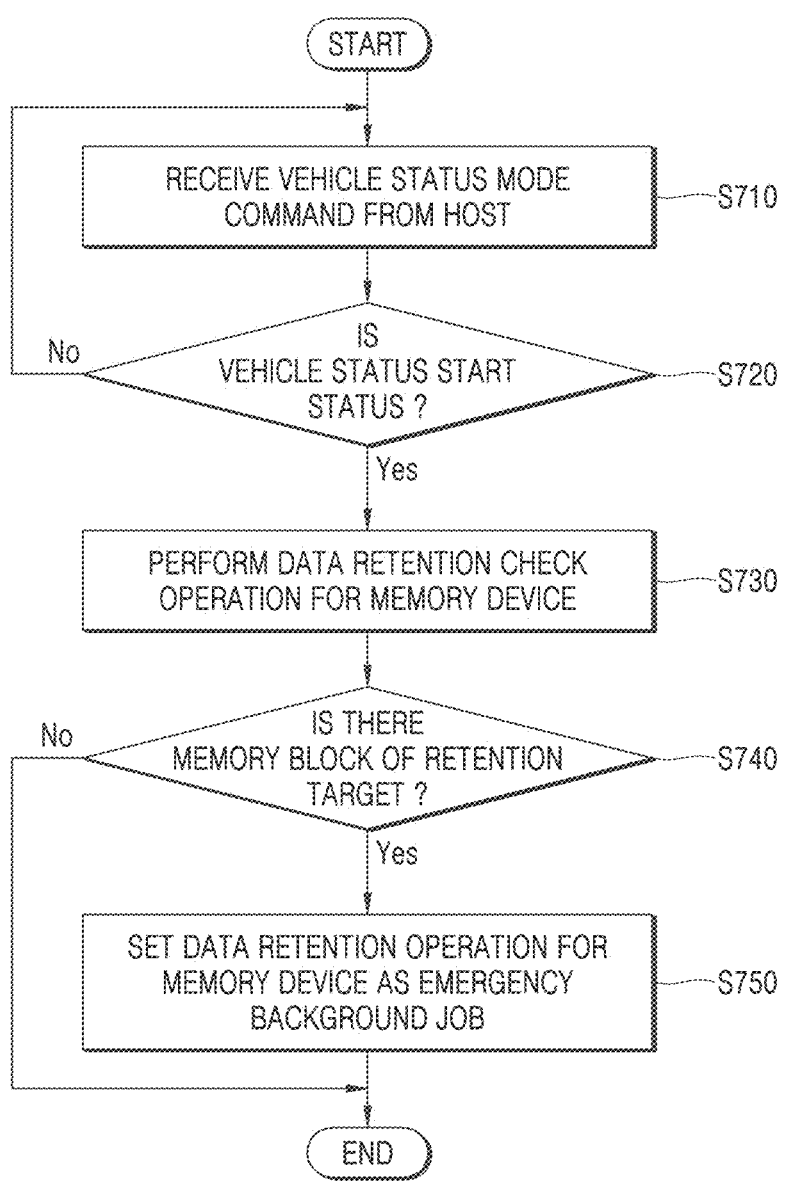
FIGS. 7 and 8 are flowcharts illustrating an operating method of a memory device when a vehicle status is a start status, according to an example embodiment.
Figure 8:
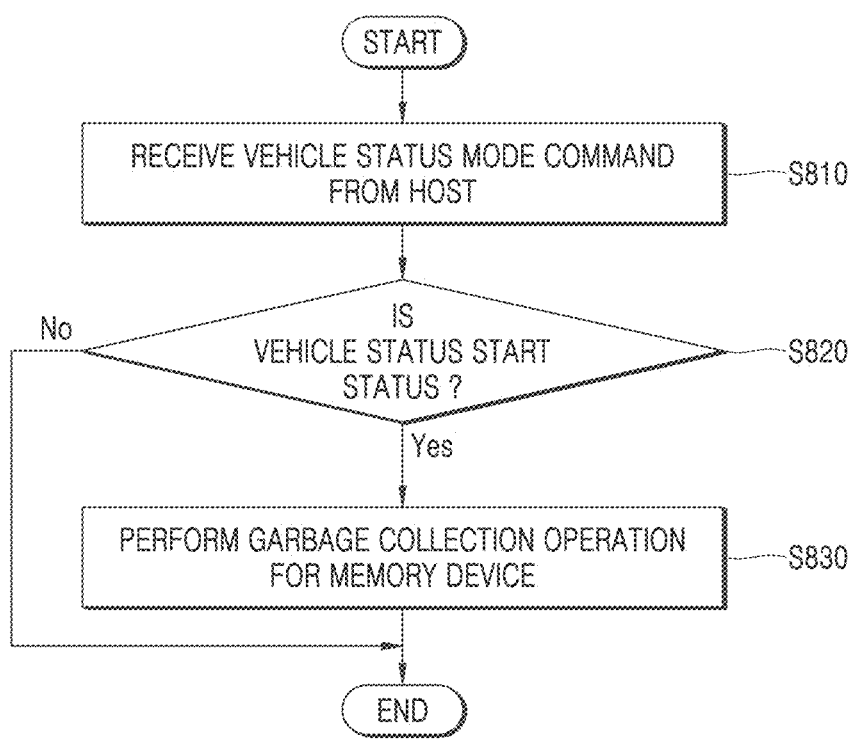

FIGS. 7 and 8 are flowcharts illustrating an operating method of a memory device when a vehicle status is a start status, according to an example embodiment.

FIG. 7 is a flowchart illustrating an example embodiment in which a memory device performs a data retention operation in a start status. FIG. 8 is a flowchart illustrating an example embodiment in which a memory device performs a garbage collection operation in a start status.

Referring to FIGS. 1 and 7, the memory device 100 according to an example embodiment may receive a vehicle status mode command Vehicle Status Mode CMD from the host 200 (S710). A vehicle status mode according to an example embodiment refers to a status in which the host 200 may determine a vehicle status and determine whether to execute a background job. The memory device 100 according to an example embodiment may receive the vehicle status mode command Vehicle Status Mode CMD from the host 200 and execute a background job based on the received vehicle status mode command Vehicle Status Mode CMD.

When receiving the vehicle status mode command Vehicle Status Mode CMD, the memory device 100 according to an example embodiment may determine whether a vehicle status is a start status (S720). The start status according to an example embodiment may be a status in which power starts to be supplied to a vehicle.

When it is determined that a vehicle status is the start status, the memory device 100 according to an example embodiment may perform a data retention check operation for the memory device 100 (S730). For example, when power starts to be supplied to a vehicle, the scheduler 120 may perform the data retention check operation for the memory device 100. The data retention check operation according to an example embodiment may include an operation of determining whether at least one of memory cells included in the memory device 100 degrades and data stored therein has to be retained.

However, when it is determined that the vehicle status is not the start status, the memory device 100 according to an example embodiment may continuously receive the vehicle status mode command Vehicle Status Mode CMD.

When the data retention check operation for the memory device 100 is performed, the memory device 100 according to an example embodiment may determine whether there is a memory block of a retention target (S740). When it is determined that there is a memory block of a retention target, the memory device 100 according to an example embodiment may classify a data retention operation for the memory device 100 as an emergency background job (S750).

When it is determined that there is a memory block of a retention target, the scheduler 120 according to an example embodiment may classify the data retention operation for the memory device 100 as the emergency background job. The emergency background job according to an example embodiment may be a job that has to be executed with the highest priority (or alternatively, with priority) among background jobs determined by the scheduler 120.

However, when it is determined that there is no memory block of a retention target, the memory device 100 according to an example embodiment may terminate the background job.

Referring to FIGS. 1 and 8, the memory device 100 according to an example embodiment may receive the vehicle status mode command Vehicle Status Mode CMD from the host 200 (S810). A vehicle status mode according to an example embodiment refers to a status in which the host 200 may determine the vehicle status and determine whether to execute a background job. The memory device 100 according to an example embodiment may receive the vehicle status mode command Vehicle Status Mode CMD from the host 200 and execute a background job based on the received vehicle status mode command Vehicle Status Mode CMD.

When receiving the vehicle status mode command Vehicle Status Mode CMD, the memory device 100 according to an example embodiment may determine whether a vehicle status is a start status (S820). The start status according to an example embodiment may be a status in which power starts to be supplied to a vehicle.

When it is determined that the vehicle status is the start status, the memory device 100 according to an example embodiment may perform a garbage collection operation for the memory device 100 (S830). For example, when the vehicle status is the start status, the scheduler 120 may generate a background job for the garbage collection operation for the memory device 100 and perform the garbage collection operation. When it is determined that the vehicle status is the start status, the memory device 100 according to an example embodiment may determine whether there is invalid data in a memory block, move valid data in the memory block, and erase the memory block to obtain a free block.

Figure 9:
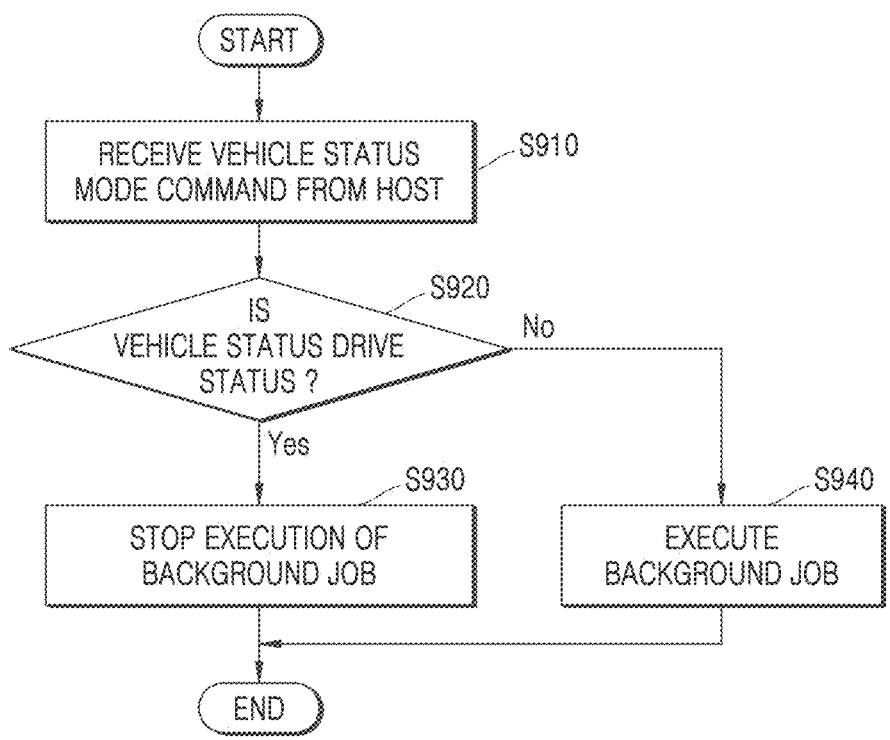
FIG. 9 is a flowchart illustrating an operating method of a memory device when a vehicle status is a drive status, according to an example embodiment.

FIG. 9 is a flowchart illustrating an operating method of a memory device when a vehicle status is a drive status, according to an example embodiment.

Referring to FIGS. 1 and 9, the memory device 100 according to an example embodiment may receive the vehicle status mode command Vehicle Status Mode CMD from the host 200 (S910). A vehicle status mode according to an example embodiment refers to a status in which the host 200 may determine a vehicle status and determine whether to execute a background job. The memory device 100 according to an example embodiment may receive the vehicle status mode command Vehicle Status Mode CMD from the host 200 and execute a background job based on the received vehicle status mode command Vehicle Status Mode CMD.

When receiving the vehicle status mode command Vehicle Status Mode CMD, the memory device 100 according to an example embodiment may determine whether the vehicle status is a drive status (S920). The drive status according to an example embodiment may be a status in which a vehicle moves without stopping while power is supplied to the vehicle.

When it is determined that a vehicle status is the drive status, the memory device 100 according to an example embodiment may stop the background job (S930). When it is determined that the vehicle status is the drive status, the scheduler 120 may stop a background job executed by a vehicle and execute a job according to a certain command.

However, when it is determined that the vehicle status is not the drive status, the memory device 100 according to an example embodiment may execute the background job (S940).

Figure 10:
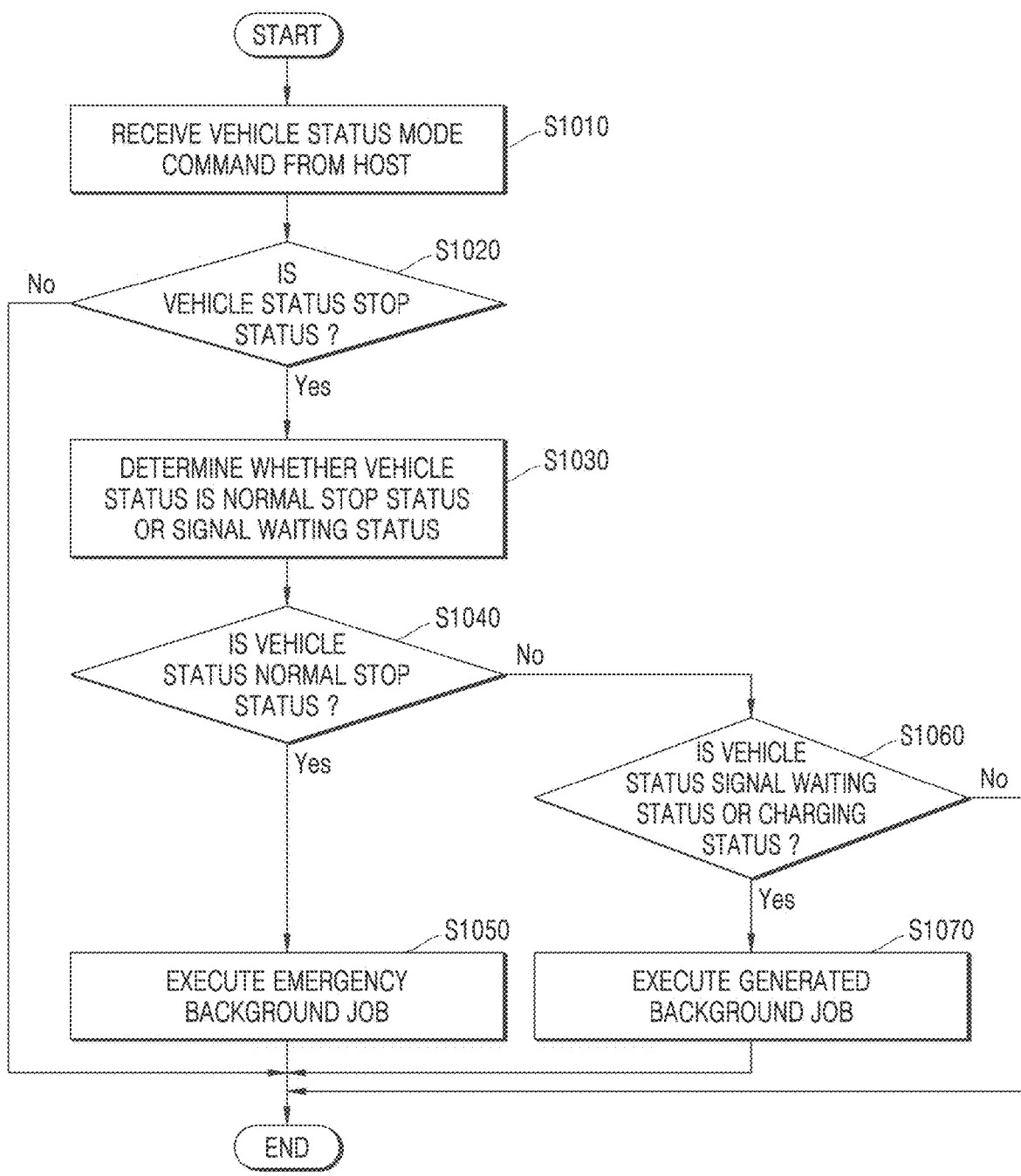
FIG. 10 is a flowchart illustrating an operating method of a memory device when a vehicle status is a stop status, according to an example embodiment.

FIG. 10 is a flowchart illustrating an operating method of a memory device when a vehicle status is a stop status, according to an example embodiment.

Referring to FIGS. 1 and 10, the memory device 100 according to an example embodiment may receive the vehicle status mode command Vehicle Status Mode CMD from the host 200 (S1010). A vehicle status mode according to an example embodiment refers to a status in which the host 200 may determine a vehicle status and determine whether to execute a background job. The memory device 100 according to an example embodiment may receive the vehicle status mode command Vehicle Status Mode CMD from the host 200 and execute a background job based on the received vehicle status mode command Vehicle Status Mode CMD.

When receiving the vehicle status mode command Vehicle Status Mode CMD, the memory device 100 according to an example embodiment may determine whether the vehicle status is a stop status (S1020). The stop status according to an example embodiment may be a status in which power is supplied to a vehicle and the vehicle does not move.

When it is determined that the vehicle status is the stop status, the memory device 100 according to an example embodiment may determine whether the vehicle status is a normal stop status or a signal waiting status (S1030). The normal stop status according to an example embodiment may be a status in which a vehicle stops in drive while power is supplied and is not in a signal waiting status. The signal waiting status according to an example embodiment may be a status in which a vehicle stops in drive and stops to wait for a signal, based on a detection result of a sensor installed in a vehicle.

When it is determined that the vehicle status is a normal stop status, the memory device 100 according to an example embodiment may execute an emergency background job (S1040 and S1050).

When the vehicle status is the normal stop status, the scheduler 120 according to an example embodiment may execute only the emergency background job (or alternatively, the scheduler 120 may execute the emergency background job). The emergency background job according to an example embodiment may be a background job determined as the one with the highest priority (or alternatively, with priority) among background jobs generated by the scheduler 120. For example, when the vehicle status is the normal stop status, the scheduler 120 may generate only the emergency background job (or alternatively, the scheduler 120 may generate the emergency background job). When the generated emergency background job is a data retention operation, the scheduler 120 according to an example embodiment may perform only the data retention operation when the vehicle status is the normal stop status (or alternatively, the scheduler 120 may perform the data retention operation when the vehicle status is the normal stop status).

However, when it is determined that the vehicle status is not the normal stop status, the memory device 100 according to an example embodiment may determine whether the vehicle status is a signal waiting status or a charging status (S1060). The charging status according to an example embodiment may be a status in which a vehicle stops and receives power from an external power supply to charge a battery in the vehicle.

When it is determined that the vehicle status is the signal waiting status or the charging status, the memory device 100 according to an example embodiment may execute the generated background job (S1070).

For example, the scheduler 120 may determine whether the vehicle status is a normal stop status or the signal waiting status based on a sensor installed in a vehicle. When it is determined that the vehicle status is the signal waiting status, the scheduler 120 according to an example embodiment may determine that a background job may be executed during a signal waiting time and generate background jobs to be executed. For example, when it is determined that the signal waiting time is 3 minutes as a result of a sensor's detection, the scheduler 120 may generate a background job to be executed for 3 minutes. However, the signal waiting time is not limited thereto.

In another example, when the vehicle status is the charging status, the scheduler 120 may generate background jobs based on the received vehicle status mode command and determine a sequence of the generated background jobs. When the vehicle status is the charging status, the scheduler 120 according to an example embodiment may generate background jobs such that the generated background jobs are executed sequentially.

However, when it is determined that the vehicle status is not the signal waiting status or the charging status, the memory device 100 according to an example embodiment may terminate the background jobs.

Figure 11:
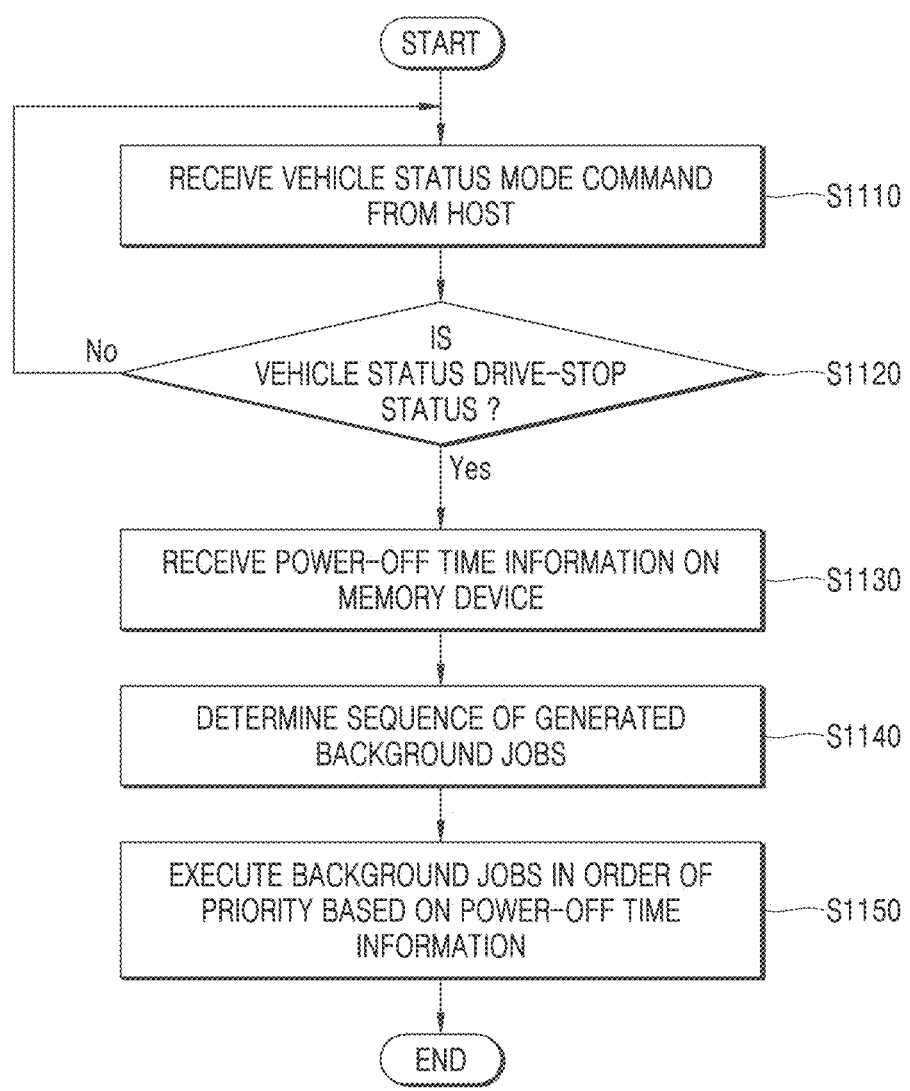
FIG. 11 is a flowchart illustrating an operating method of a memory device when a vehicle status is a drive-stop status, according to an example embodiment.

FIG. 11 is a flowchart illustrating an operating method of a memory device when a vehicle status is a drive-stop status, according to an example embodiment.

Referring to FIGS. 1 and 11, the memory device 100 according to an example embodiment may receive a vehicle status mode command Vehicle Status Mode CMD from the host 200 (S1110). A vehicle status mode according to an example embodiment refers to a status in which the host 200 may determine a vehicle status and determine whether to execute a background job. The memory device 100 according to an example embodiment may receive the vehicle status mode command Vehicle Status Mode CMD from the host 200 and execute a background job based on the received vehicle status mode command Vehicle Status Mode CMD.

When receiving the vehicle status mode command Vehicle Status Mode CMD, the memory device 100 according to an example embodiment may determine whether a vehicle status is a drive-stop status (S1120). The drive-stop status according to an example embodiment may be a status in which a vehicle stops and power supplied to the vehicle is disconnected.

When it is determined that the vehicle status is the drive-stop status, the memory device 100 according to an example embodiment may receive power-off time information on the memory device 100 (S1130). For example, when the vehicle status is the drive-stop status, the power supplied to the memory device 100 may also be disconnected. When the vehicle status is the drive-stop status, the memory device 100 according to an example embodiment may receive time information until the power supplied to the memory device 100 is completely disconnected (or alternatively, is disconnected).

The memory device 100 according to an example embodiment may determine a sequence of the generated background jobs (S1140).

For example, when the vehicle status is a charging status, the memory device 100 may generate background jobs based on the received vehicle status mode command and determine the sequence of the generated background jobs. When the vehicle status is the charging status, the memory device 100 according to an example embodiment may generate background jobs such that the generated background jobs are executed sequentially.

When receiving the power-off time information and the sequence of the background jobs are determined, the memory device 100 according to an example embodiment may execute the background jobs in order of priority based on the power-off time information (S1150).

For example, when the vehicle status is a drive-stop status, the memory device 100 according to an example embodiment may receive the power-off time information on the memory device 100, determine the sequence of the generated background jobs, and execute the background jobs in order of priority based on the power-off time information.

Figure 12:
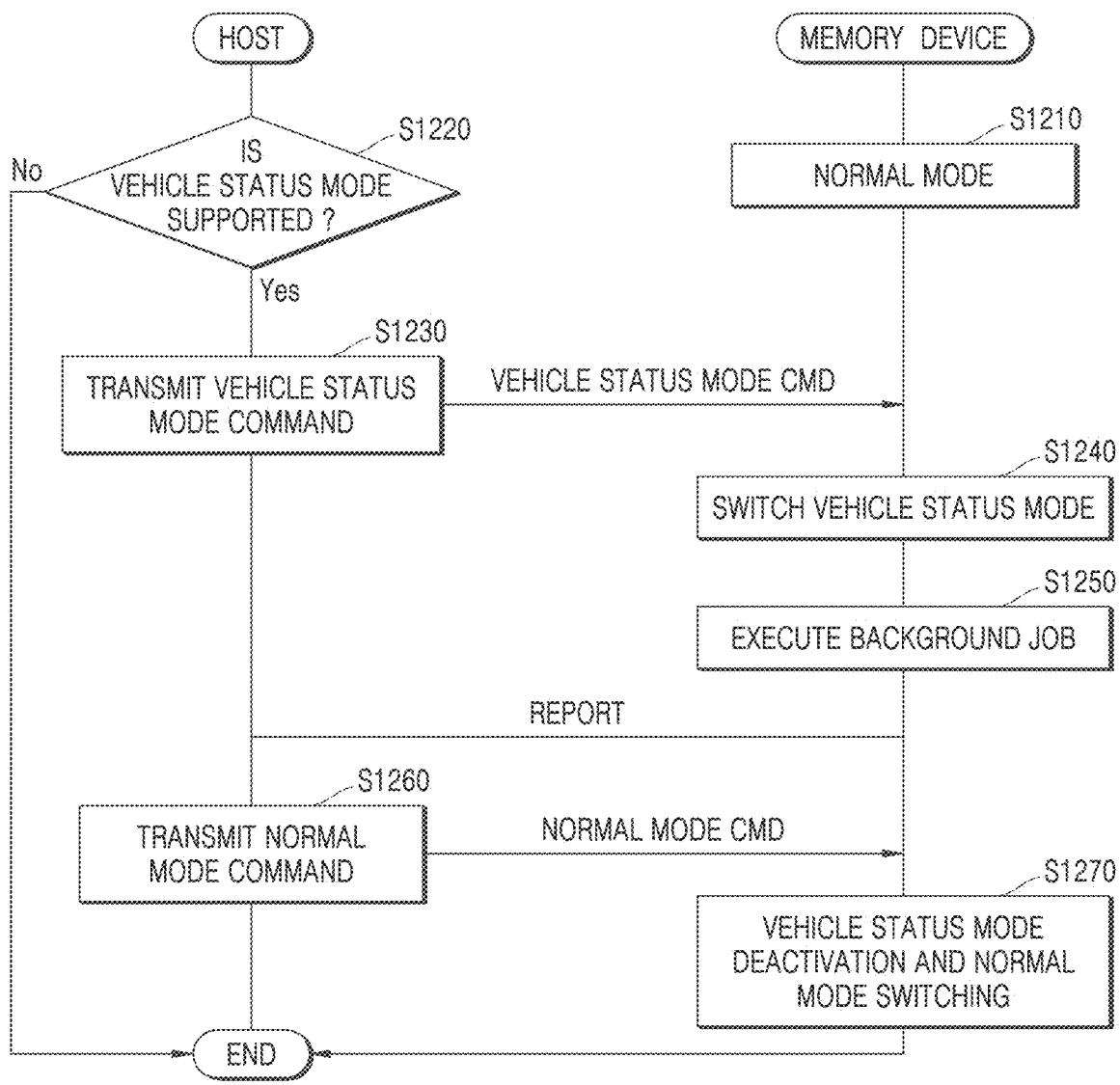
FIG. 12 is a flowchart illustrating an operating method of a memory system, according to an example embodiment.

FIG. 12 is a flowchart illustrating an operating method of a memory system, according to an example embodiment.

Referring to FIGS. 1 and 12, the memory device 100 according to an example embodiment may be in a normal mode status (S1210). The normal mode status according to an example embodiment may be a status in which the memory device 100 does not execute a background job and performs a preset operation based on an individual command received from the host 200. The background job according to an example embodiment may be a job executed by the memory device 100 without a separate individual command from the host 200.

The host 200 according to an example embodiment may determine whether a vehicle supports a vehicle status mode (S1220). The vehicle status mode according to an example embodiment refers to a status in which the host 200 may determine a vehicle status and determine whether to execute a background job.

When it is determined that the vehicle supports the vehicle status mode, the host 200 according to an example embodiment may transmit the vehicle status mode command Vehicle Status Mode CMD to the memory device 100 (S1230). For example, the host 200 may generate the vehicle status mode command Vehicle Status Mode CMD and transmit the generated vehicle status mode command Vehicle Status Mode CMD to the memory device 100. The host 200 according to an example embodiment may be included in a vehicle and generate a plurality of commands and transmit the plurality of commands to the memory device 100.

However, in some example embodiments, when it is determined that a vehicle does not support the vehicle status mode, the host 200 may terminate executing a background job without transmitting the vehicle status mode command Vehicle Status Mode CMD.

When receiving the vehicle status mode command Vehicle Status Mode CMD, the memory device 100 according to an example embodiment may switch to the vehicle status mode (S1240).

When switched to the vehicle status mode, the memory device 100 according to an example embodiment may execute a background job (S1250). A background job according to an example embodiment may be a job executed by the memory device 100 without a separate individual command from the host 200. For example, the background job may include at least one of a garbage collection operation, a patrol read operation, a flush operation, a data retention check operation, and a reclaim operation for the memory device 100 but is not limited thereto and may further include jobs capable of being executed by the memory device 100 without using a separate command.

The memory device 100 according to an example embodiment may generate a command on the background job based on the vehicle status mode command Vehicle Status Mode CMD received from the host 200 and determine whether the vehicle status is a status in which the background job may be executed. The memory device 100 according to an example embodiment may generate classified background jobs based on the determination result. Also, when it is determined that the vehicle status is in a status in which the background job may be executed, the memory device 100 according to an example embodiment may set the vehicle status as at least one of a start status, a drive status, a stop status, a charging status, and a drive-stop status and determine a sequence of background jobs based on the set vehicle status. The memory device 100 according to an example embodiment may generate background jobs based on the determination result, determine a sequence of the generated background jobs, and execute the background jobs in the determined sequence. For example, when it is determined that the vehicle status is a status in which a background job may be executed, the memory device 100 may determine the sequence of background jobs based on the vehicle status and perform at least one of a garbage collection operation, a patrol read operation, a flush operation, a data retention check operation, and a reclaim operation in the determined sequence. When the background job is executed, the memory device 100 according to an example embodiment may transmit a report signal Report on a result of the background job to the host 200.

When receiving the report signal on the result of the background job, the host 200 according to an example embodiment may transmit a normal mode command Normal Mode CMD to the memory device 100 (S1260). For example, when receiving the report signal on the result of the background job, the host 200 may determine that the background job is successfully executed and switch a vehicle mode back to a normal mode.

When receiving the normal mode command Normal Mode CMD, the memory device 100 according to an example embodiment may perform a vehicle status mode deactivation operation and a normal mode switching operation (S1270). The memory device 100 according to an example embodiment may perform a preset operation based on an individual command from the host 200 in the normal mode.

Figure 13:
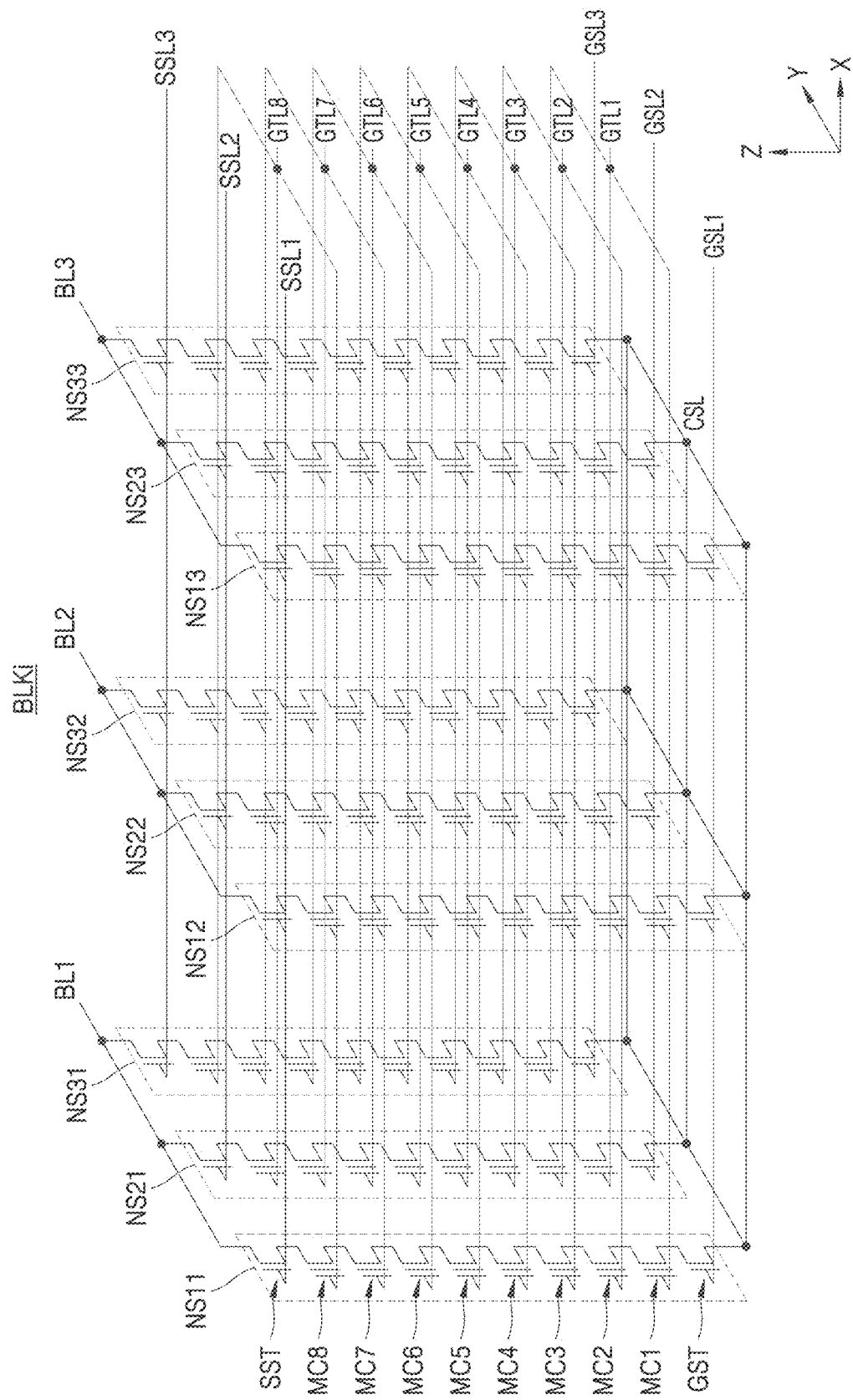
FIGS. 13 to 15 illustrate a three-dimensional V-NAND structure that may be applied to a memory device, according to an example embodiment.
Figure 14:
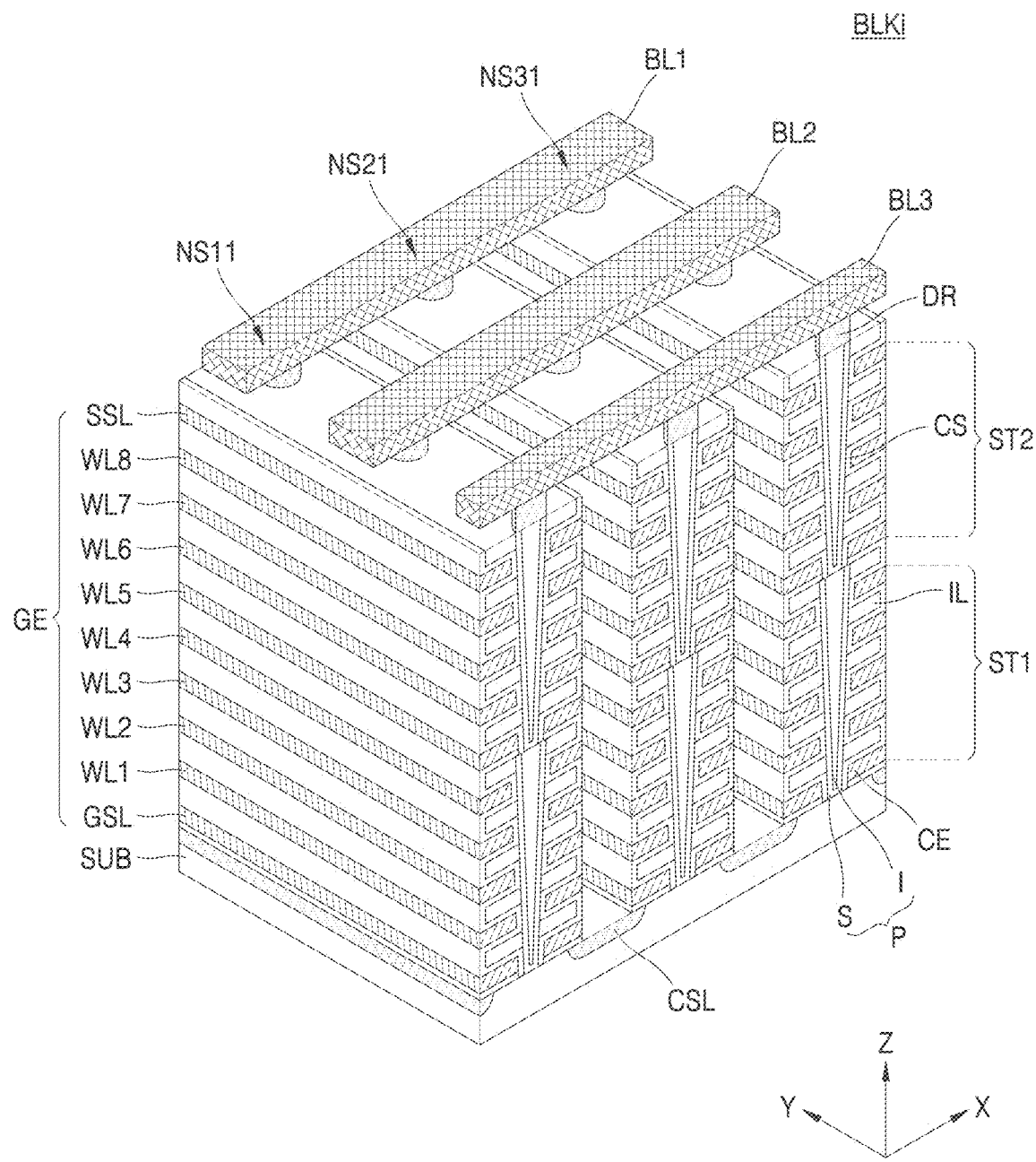
Figure 15:
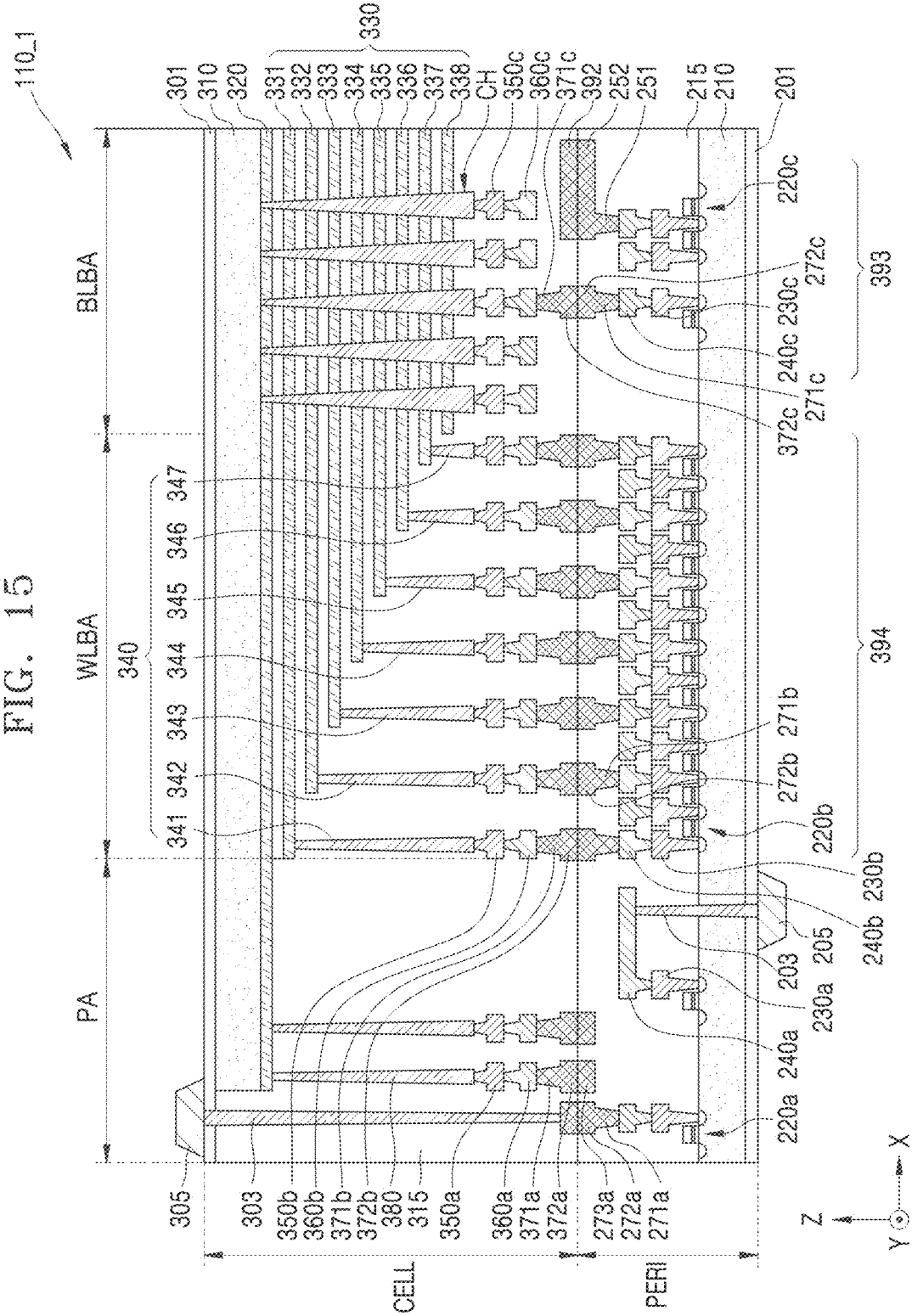

FIGS. 13 to 15 illustrate a three-dimensional V-NAND structure that may be applied to a memory device according to an example embodiment.

Referring to FIGS. 13 to 15, a first nonvolatile memory 110_1 applicable to the memory device 100 illustrated in FIG. 1 may include a plurality of memory blocks. FIGS. 13 and 14 illustrate a structure of one memory block BLKi among a plurality of memory blocks, and FIG. 15 illustrates an implementation example when the memory device 100 (illustrated in FIG. 1) is a non-volatile memory.

Referring to FIG. 13, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1 to MC8, and a ground select transistor GST. For the sake of brevity of drawings, FIG. 13 illustrates that each of the plurality of memory NAND strings NS11 to NS33 includes eight memory cells MC1 to MC8 but is not limited thereto.

The string select transistor SST may be connected to a corresponding string select line among a plurality of string select lines SSL1, SSL2, and SSL3. The plurality of memory cells MC1 to MC8 may be respectively connected to a plurality of gate lines GTL1 to GTL8. The plurality of gate lines GTL1 to GTL8 may correspond to a plurality of word lines, and some of the plurality of gate lines GTL1 to GTL8 may correspond to dummy word lines. The ground select transistor GST may be connected to a corresponding ground select line among a plurality of ground select lines GSL1, GSL2, and GSL3. The string select transistor SST may be connected to a corresponding bit line among the bit lines BL1, BL2, and BL3, and the ground select transistor GST may be connected to the common source line CSL.

Gate lines (for example, GTL1) at the same height may be connected to each other, and the plurality of ground selection lines GSL1, GSL2, and GSL3 may be selected from the plurality of string selection lines SSL1, SSL2, and SSL3. Although FIG. 13 illustrates that the memory block BLK is connected to eight gate lines GTL1 to GTL8 and three bit lines BL1, BL2, and BL3, inventive concepts are not limited thereto.

Referring to FIG. 14, the memory block BLKi is formed in a vertical direction with respect to a substrate SUB. Memory cells constituting each of the memory NAND strings NS11 to NS33 are formed by being stacked in a plurality of semiconductor layers.

The common source line CSL extending in a first direction (the Y direction) is on the substrate SUB. A plurality of insulating layers IL extending in the first direction (the Y direction) are sequentially provided in a third direction (the Z direction) in a region between two adjacent common source lines CSL on the substrate SUB and may be separated from each other by a certain distance in the third direction (the Z direction). A plurality of pillars P may be sequentially arranged in the first direction (the Y direction) in a region between two adjacent common source lines CSL on the substrate SUB and pass through the plurality of insulating layers IL. The plurality of pillars P may pass through the plurality of insulating layers IL to be in contact with the substrate SUB. A surface layer S of each of the plurality of pillars P may include a silicon material doped with a first conductivity-type impurity and may function as a channel region.

An inner layer I of each the plurality of pillars P may include an insulating material, such as silicon oxide, or an air gap. In a region between two adjacent common source lines CSL, a charge storage layer CS may be provided along the plurality of insulating layers IL, the plurality of pillars P, and an exposed surface of the substrate SUB. The charge storage layer CS may include a gate insulating layer (also referred to as a "tunneling insulating layer"), a charge trap layer, and a blocking insulating layer. Also, in the region between two adjacent common source lines CSL, gate electrodes GE, such as select lines GSL and SSL and a plurality of word lines WL1 to WL8, may be provided on an exposed surface of the charge storage layer CS. Drains or drain contacts DR may be respectively on the plurality of pillars P. The bit lines BL1 to BL3 extending in a second direction (the X direction) and separated from each other by a certain distance in the first direction (the Y direction) may be respectively on the drain contacts DR.

As illustrated in FIG. 14, each of the plurality of memory NAND string NS11 to NS33 may also have a structure in which a first memory stack ST1 and a second memory stack ST2 are stacked. The first memory stack ST1 may be connected to the common source line CSL, the second memory stack ST2 may be connected to the bit lines BL1 to BL3, and the first memory stack ST1 and the second memory stack ST2 are stacked to share channel holes with each other.

Referring to FIG. 15, a nonvolatile memory may have a chip-to-chip (C2C) structure. In the C2C structure, an upper chip including a cell region CELL may be on a first wafer, a lower chip including a peripheral circuit region PERI may be on a second wafer that is different from the first wafer, and the upper chip may be connected to the lower chip by bonding. For example, the bonding may refer to electrically connecting a bonding metal formed on an uppermost metal layer of the upper chip to a bonding metal formed on an uppermost metal layer of the lower chip. For example, when the bonding metal is copper (Cu), the bonding may be Cu—Cu bonding, and the bonding metal may also include aluminum (Al) or tungsten (W), but example embodiments are not limited thereto.

Each of the peripheral circuit region PERI and the cell region CELL of the nonvolatile memory may include an external pad bonding region PA, a word line bonding region WLBA, and a bit line bonding region BLBA.

The peripheral circuit region PERI may include a first substrate 210, an interlayer insulating layer 215, a plurality of circuit elements 220a, 220b, and 220c formed on the first substrate 210, first metal layers 230a, 230b, and 230c respectively connected to the plurality of circuit elements 220a, 220b, and 220c, and second metal layers 240a, 240b, and 240c respectively formed on the first metal layers 230a, 230b, and 230c. In an example embodiment, the first metal layers 230a, 230b, and 230c may be formed of tungsten with relatively high electrical resistivity, and the second metal layers 240a, 240b, and 240c may be formed of copper with relatively low electrical resistivity.

Although only the first metal layers 230a, 230b, and 230c and the second metal layers 240a, 240b, and 240c are illustrated and described, the present inventive concepts are not limited thereto, and at least one metal layer may be further formed on the second metal layers 240a, 240b, and 240c. At least some of the one or more metal layers formed on the second metal layers 240a, 240b, and 240c may be formed of aluminum or so on with lower electrical resistivity than copper forming the second metal layers 240a, 240b, and 240c.

The interlayer insulating layer 215 may be on the first substrate 210 to cover the plurality of circuit elements 220a, 220b, 220c, the first metal layers 230a, 230b, and 230c, and the second metal layers 240a, 240b, and 240c and may include an insulating material, such as silicon oxide, silicon nitride, or so on.

Lower bonding metals 271b and 272b may be formed on the second metal layer 240b of the word line bonding region WLBA. In the word line bonding region WLBA, the lower bonding metals 271b and 272b of the peripheral circuit region PERI may be electrically connected to upper bonding metals 371b and 372b of the cell region CELL by a bonding method, and the lower bonding metals 271b and 272b and the upper bonding metals 371b and 372b may each be formed of aluminum, copper, or tungsten, but example embodiments are not limited thereto.

The cell region CELL may provide at least one memory block. The cell region CELL may include a second substrate 310 and a common source line 320. A plurality of word lines 331 to 338 (or 330) may be stacked on the second substrate 310 in a direction (the Z-axis direction) perpendicular to an upper surface of the second substrate 310. String select lines and a ground select line may be respectively arranged above and below the word lines 330, and the plurality of word lines 330 may be between the string select lines and the ground select line.

In the bit line bonding region BLBA, a channel structure CH may extend in a direction (the Z-axis direction) perpendicular to the upper surface of the second substrate 310 to pass through the plurality of word lines 330, the string select lines, and the ground select line. The channel structure CH may include a data storage layer, a channel layer, and a buried insulating layer, and the channel layer may be electrically connected to a first metal layer 350c and a second metal layer 360c. For example, the first metal layer 350c may be a bit line contact, and the second metal layer 360c may be referred to as a bit line 360c. In an example embodiment, the bit line 360c may extend in a first direction (the Y-axis direction) parallel to the upper surface of the second substrate 310.

A region where the channel structure CH and the bit line 360c are arranged may be defined as the bit line bonding region BLBA. In the bit line bonding region BLBA and the peripheral circuit region PERI, the bit line 360c may be electrically connected to the circuit elements 220c included in a page buffer 393. For example, the bit line 360c may be connected to the upper bonding metals 371c and 372c, and the upper bonding metals 371c and 372c may be connected to the lower bonding metals 271c and 272c connected to the circuit elements 220c of the page buffer 393 in the peripheral circuit region PERI.

In the word line bonding region WLBA, the plurality of word lines 330 may extend in a second direction (the X-axis direction) perpendicular to the first direction and parallel to the upper surface of the second substrate 310, and may be connected to a plurality of cell contact plugs 341 to 347 (or 340). The plurality of word lines 330 may be respectively connected to the plurality of cell contact plugs 340 respectively through pads which are respectively formed by extending in the second direction at least some of the plurality of word lines 330 in different lengths. A first metal layer 350b and a second metal layer 360b may be sequentially connected to an upper portion of each of the plurality of cell contact plugs 340 respectively connected to the plurality of word lines 330. The plurality of cell contact plugs 340 in the word line bonding region WLBA may be connected through the upper bonding metals 371b and 372b in the cell region CELL to the lower bonding metals 271b and 272b in the peripheral circuit region PERI.

The plurality of cell contact plugs 340 may be electrically connected to the circuit elements 220b included in a row decoder 394 in the peripheral circuit region PERI. In an example embodiment, operating voltages of the circuit elements 220b included in the row decoder 394 may be different from operating voltages of the circuit elements 220c included in the page buffer 393. For example, the operating voltages of the circuit elements 220c included in the page buffer 393 may be greater than the operating voltages of the circuit elements 220b included in the row decoder 394.

A common source line contact plug 380 may be in the external pad bonding region PA. The common source line contact plug 380 may be formed of a conductive material, such as metal, metal compound, or polysilicon, and may be electrically connected to the common source line 320. A first metal layer 350a and a second metal layer 360a may be sequentially stacked on the common source line contact plug 380. For example, a region where the common source line contact plug 380, the first metal layer 350a, and the second metal layer 360a are arranged may be defined as the external pad bonding region PA.

In addition, first input/output pad 205 and second input/output pad 305 may be in the external pad bonding region PA. A lower insulating layer 201 covering a lower surface of the first substrate 210 may be formed on a lower portion of the first substrate 210, and the first input/output pad 205 may be formed on the lower insulating layer 201. The first input/output pad 205 may be connected through the first input/output contact plug 203 to at least one of the plurality of circuit elements 220a, 220b, and 220c in the peripheral circuit region PERI, and may be separated from the first substrate 210 by the lower insulating layer 201. Also, a side insulating layer may be between the first input/output contact plug 203 and the first substrate 210 to electrically separate the first input/output contact plug 203 from the first substrate 210.

An upper insulating layer 301 covering an upper surface of the second substrate 310 may be formed on the second substrate 310, and the second input/output pad 305 may be on the upper insulating layer 301. The second input/output pad 305 may be connected through the second input/output contact plug 303 to at least one of the plurality of circuit elements 220a, 220b, and 220c in the peripheral circuit region PERI. In an example embodiment, the second input/output pad 305 may be electrically connected to the circuit element 220a.

In some example embodiments, the second substrate 310, the common source line 320, and so on may not be in a region where the second input/output contact plug 303 is arranged. Also, the second input/output pad 305 may not overlap the plurality of word lines 330 in the third direction (the Z-axis direction). The second input/output contact plug 303 may be separated from the second substrate 310 in a direction parallel to an upper surface of the second substrate 310 and may pass through an interlayer insulating layer 315 in the cell region CELL to be connected to the second input/output pad 305.

In some example embodiments, the first input/output pad 205 and the second input/output pad 305 may be formed selectively. For example, the nonvolatile memory 1101 may include (or alternatively, may only include) the first input/output pad 205 on an upper portion of the first substrate 210, or may include (or alternatively, may only include) the second input/output pad 305 on an upper portion of the second substrate 310. Alternatively, the nonvolatile memory 1101 may include both the first input/output pad 205 and the second input/output pad 305.

A metal pattern of an uppermost metal layer may be formed as a dummy pattern or the uppermost metal layer may not be formed in each of the external pad bonding region PA and the bit line bonding region BLBA included in each of the cell region CELL and the peripheral circuit region PERI.

In the external pad bonding region PA of the nonvolatile memory 1101, a lower metal pattern 273a having the same shape as an upper metal pattern 372a of the cell region CELL may be formed on an uppermost metal layer in the peripheral circuit region PERI to correspond to the upper metal pattern 372a formed on an uppermost metal layer in the cell region CELL. The lower metal pattern 273a formed on the uppermost metal layer in the peripheral circuit region PERI may not be connected to a separate contact in the peripheral circuit region PERI. Similarly, in the external pad bonding region PA, an upper metal pattern 373a having the same shape as the lower metal pattern 273a in the peripheral circuit region PERI may also be formed on an upper metal layer in the cell region CELL to correspond to the lower metal pattern 273a formed on the uppermost metal layer in the peripheral circuit region PERI.

The lower bonding metals 271b and 272b may be formed on the second metal layer 240b in the word line bonding region WLBA. In the word line bonding region WLBA, the lower bonding metals 271b and 272b in the peripheral circuit region PERI may be electrically connected to the upper bonding metals 371b and 372b in the cell region CELL by a bonding method.

Also, in the bit line bonding region BLBA, an upper metal pattern 392 having the same shape as a lower metal pattern 252 in the peripheral circuit region PERI may be formed on an uppermost metal layer in the cell region CELL to correspond to the lower metal pattern 252 formed on an uppermost metal layer in the peripheral circuit region PERI. A contact may not be formed on the upper metal pattern 392 formed on the uppermost metal layer in the cell region CELL.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described above, some inventive concepts are described through various example embodiments, and those skilled in the art in which the inventive concepts belongs will be able to make various modifications and changes to the various example embodiments described above without departing from the essential characteristics of the inventive concepts. Accordingly, various example embodiments according to the inventive concepts are for illustrative purposes rather than limiting the technical idea of the inventive concepts, and the scope of the inventive concepts is not limited to the various example embodiments. The scope of protection of the inventive concepts according to various example embodiments described above should be interpreted in accordance with the claims below, and all technical ideas within the equivalent scope should be interpreted as being included in the scope of rights of the inventive concepts.

While some inventive concepts have been particularly shown and described with reference to various example embodiments thereof, it will be understood that various changes in form and details may be made therein without departing from the spirit and scope of the following claims.

What is claimed is:

1. A memory device comprising:
   a command executor configured to generate a command on background jobs based on a received vehicle status mode command;
   a scheduler configured to
     receive the command on the background jobs,
     determine whether a vehicle status is a status in which the background jobs are able to be executed, and
     generate the background jobs based on a determination result; and
   a background job executor configured to execute the background jobs generated by the scheduler,
   wherein the scheduler is configured to set the vehicle status as at least one of a start status, a drive status, a stop status, a charging status, and a drive-stop status when the vehicle status is determined to be a status in which the background jobs are able to be executed, and the scheduler is further configured to determine a sequence of the background jobs based on the set vehicle status.

2. The memory device of claim 1, wherein each of the background jobs includes at least one of a garbage collection operation, a patrol read operation, a flush operation, a data retention check operation, and a reclaim operation for the memory device.

3. The memory device of claim 1, wherein, when the vehicle status is the start status, the scheduler is configured to generate a data retention check operation for the memory device.

4. The memory device of claim 3, wherein, when there is a memory block of a retention target, the scheduler is configured to set a data retention operation for the memory device as an emergency background job.

5. The memory device of claim 1, wherein, when the vehicle status is the start status, the scheduler is configured to generate a garbage collection operation for the memory device.

6. The memory device of claim 1, wherein, when the vehicle status is the drive status, the scheduler is configured to stop execution of the background job.

7. The memory device of claim 1, wherein, when the vehicle status is the stop status, the scheduler is configured to determine whether the vehicle status is a normal stop status or a signal waiting status.

8. The memory device of claim 7, wherein, when the vehicle status is the normal stop status, the background job executor is configured to execute only an emergency background job.

9. The memory device of claim 1, wherein, when the vehicle status is one of a signal waiting status or the charging status, the background job executor is configured to execute the generated background jobs.

10. The memory device of claim 1, wherein, when the vehicle status is the stop status, the scheduler is configured to
    receive power-off time information on the memory device, and
    execute the background jobs in order of priority based on the power-off time information.

11. An operating method of a memory device, the operating method comprising:
    receiving a vehicle status mode command from a host; and
    executing background jobs based on the received vehicle status mode command, wherein the executing of the background jobs includes
generating a command on the background jobs based on the received vehicle status mode command;
receiving the command on the background jobs, determining whether a vehicle status is a status in which the background jobs are able to be executed, and generating the background jobs based on a determination result; and
executing the generated background jobs,
wherein the generating of the background jobs includes
setting the vehicle status as at least one of a start status, a drive status, a stop status, a charging status, and a drive-stop status when the vehicle status is determined to be a status in which the background jobs are able to be executed, and
determining a sequence of the background jobs based on the set vehicle status.

12. The operating method of claim 11, wherein the generating of the background jobs further includes generating a data retention check operation for the memory device, when the vehicle status is the start status.

13. The operating method of claim 12, wherein the generating of the background jobs further includes setting a data retention operation for the memory device as an emergency background job, when a memory block of a retention target is determined to be there.

14. The operating method of claim 11, wherein the generating of the background jobs further includes generating a garbage collection operation for the memory device, when the vehicle status is the start status.

15. The operating method of claim 11, wherein the generating of the background jobs further includes stopping execution of the background job, when the vehicle status is the drive status.

16. The operating method of claim 11, wherein the generating of the background jobs further includes determining whether the vehicle status is a normal stop status or a signal waiting status, when the vehicle status is the stop status.

17. The operating method of claim 16, wherein the generating of the background jobs further includes generating only an emergency background job, when the vehicle status is the normal stop status.

18. The operating method of claim 11, wherein the executing the generated background jobs further includes executing the generated background jobs, when the vehicle status is one of a signal waiting status and the charging status.

19. The operating method of claim 11, wherein, when the vehicle status is the drive-stop status, power-off time information on the memory device is received, and the background jobs are executed in order of priority based on the power-off time information.

20. A memory system comprising:
a host configured to generate a vehicle status mode command; and
a memory device configured to receive the vehicle status mode command from the host and execute background jobs based on the received vehicle status mode command,
wherein the memory device includes
a command executor configured to receive the vehicle status mode command and generate a command on the background jobs based on the received vehicle status mode command;
a scheduler configured to receive the command on the background jobs, determine whether a vehicle status is a status in which the background jobs are able to be executed, and generate the background jobs based on a determination result; and
a background job executor configured to execute the background jobs generated by the scheduler,
wherein the scheduler is configured to set the vehicle status as at least one of a start status, a drive status, a stop status, a charging status, and a drive-stop status when the vehicle status is determined to be a status in which the background jobs are able to be executed, and
wherein the scheduler is further configured to determine a sequence of the background jobs based on the set vehicle status.

* * * * *